United States Patent [19]

Ikekita

[11] Patent Number: 4,597,457

[45] Date of Patent: Jul. 1, 1986

[54] ELECTRONIC SCALE WITH CRT DISPLAY

[75] Inventor: Minoru Ikekita, Kyoto, Japan

[73] Assignee: Kabushiki Kaisha Ishida Koki Seisakusho, Kyoto, Japan

[21] Appl. No.: 501,250

[22] Filed: Jun. 6, 1983

[30] Foreign Application Priority Data

| Aug. 19, 1982 | [JP] | Japan | 57-144378 |
| Dec. 1, 1982 | [JP] | Japan | 57-211866 |
| Dec. 8, 1982 | [JP] | Japan | 57-215159 |
| Jan. 28, 1983 | [JP] | Japan | 58-13414 |

[51] Int. Cl.$^4$ ................... G01G 19/22; G01G 23/32
[52] U.S. Cl. ........................... 177/25; 177/178; 364/405; 364/466
[58] Field of Search ............. 177/25, 178, DIG. 1, 177/DIG. 3; 364/405, 466

[56] References Cited

U.S. PATENT DOCUMENTS

| 4,029,161 | 6/1977 | Foster et al. | 177/DIG. 3 X |
| 4,317,172 | 2/1982 | Nakano | 364/405 |
| 4,398,253 | 8/1983 | Karp et al. | 177/25 X |
| 4,423,486 | 12/1983 | Berner | 364/466 |
| 4,424,567 | 1/1984 | Yasutake | 364/405 |

FOREIGN PATENT DOCUMENTS

| 89190 | 9/1983 | European Pat. Off. | 177/25 |
| 2953572 | 4/1981 | Fed. Rep. of Germany | 177/25 |
| 2055555 | 5/1981 | France | 177/25 |
| 2485185 | 12/1981 | France | 177/178 |
| 0141519 | 11/1981 | Japan. | |

OTHER PUBLICATIONS

Becker, M., "Ein flues der Schaltungsintegration auf die Messund Anzeigetechnik," *Messen und Prufen,* No. 11, Nov. 1978, pp. 723–725.

Diem, W., "Wiegetechnik and Anlagenbau", *Aufbereitungstechnik,* vol. 23, No. 3, Mar. 1982, pp. 149–156.

*Primary Examiner*—E. A. Goldberg
*Assistant Examiner*—Patrick W. Foster
*Attorney, Agent, or Firm*—Staas & Halsey

[57] ABSTRACT

An electronic scale with a CRT display has an input means composed of a manual data input device, weighing means for measuring the weight of an article, a CRT display unit, and a control unit for effecting an arithmetic operation based on signals from the input means and the weighing means and for controlling the CRT display unit. The CRT display unit displays input data from the input means and a result of the arithmetic operation from the control unit. There may be added a timepiece function, a totalling function, or a mode selecting function to the above construction.

4 Claims, 15 Drawing Figures

| OPERATOR | SMITH (☐) | SEPTEMBER 10, 1982 |
| --- | --- | --- |
| ARTICLE NAME | | TIME  AM 11:23 |
| (ARTICLE CODE) | UNIT PRICE  WEIGHT | PRICE |
| BEEF SIRLOIN(3021) | 980 YEN  300g | 2,940 YEN |

BEEF SIRLOIN SUBTOTAL     SMITH : SUBTOTAL
57,450 YEN                 83,475 YEN

Fig. 12

```
IF YES, PUSH 1, AND IF NO, PUSH 0, THEN, PUSH
SETTING KEY.

PRINT AUTOMATICALLY          ( Y1 )
▨  ADD                          (  1 )
   PRINT PROCESSING DATE        (  1 )
       ⋮                           ⋮
   PRINT BAR CODE               (  1 )
```

Fig. 15

| DECEMBER 9, 1981(WEDNESDAY) | 3:30 PM |
|---|---|
| BEEF RIB SIRLOIN FOR SHABU-SHABU | |
| NET WEIGHT (g) <br> 500 | TOTAL PRICE (YEN) <br> 5000 |
| PER 100g (YEN) <br> 1000 | DEPARTMENT CODE <br> 50   11001 |
| PROCESSING DATE <br> DECEMBER 9, 1981 | BEST IF USED BY <br> DECEMBER 12, 1981 |

ELECTRONIC SCALE WITH CRT DISPLAY

BACKGROUND OF THE INVENTION

The present invention relates to an electronic scale with a CRT (cathod-ray tube) display function for displaying various items of information, such for example as unit price, weight, total price, of goods weighed by the electronic scale.

There have heretofore been widely used electronic scales with a display capability for displaying the measured weight, unit price, and total price of an article to be sold. Such electronic scales normaly use four- or five-figure numerical-readout tubes for displaying weights, unit prices and total prices. Where it is necessary to display various modes such as "subtotal", "total", "department code" and the like in addition to "weight", "unit price" and "total price", particular preset numerals are entered to select such display modes, or particular function keys are depressed to enable the numerical-readout tubes to display the information. The numerical-readout tubes are associated respectively with markings such as "unit price" printed by silk screen printing process. These markings however make the user feel uneasy when the additional information is displayed as it disagrees with the markings. When the additional information items "subtotal", "total" and "department code" are to be displayed after the three principal items "weight", "unit price" and "total price" have been displayed, it would be possible to depress function keys to display the additional information items on a time-series basis, that is, alternately. However, this would require additional key depressions and prevent the user from seeing the various information items at the same time, thus imposing serious problems on electronic scales having more and more functions added for use as an information processing terminal device. The amount of information needed to be displayed cannot be fully displayed as the display capacity of numerical-readout tubes is about 10 figures at maximum. The numerical-readout tubes are also disadvantageous in that it is difficult for the user to know information such as weight data, totalling data, registration data at the moment the user operates the electronic scale, and it is entirely impossible to display information in the form of Chinese characters and graphs, for example.

The conventional electronic scales have been capable of printing on a receipt the data of sales in addition to the weight, the price, and other data. However, they have no provision for printing the time of sales. No electronic scales have been available which can total the prices in different time zones in which the electronic scale was used, that is, articles were weighed and sold. Therefore, it has not been possible to analyze data in detail so as to determine the time-dependent tendency of sales. This has prevented large-scale retail stores from effectively posting sales employees to meet sales demands varying with time.

The prior electronic scales must be switched on and off by manual intervention. They cannot automatically start and stop their operation at a preset time, and also fail to automatically start and stop the operation of other devices connected to their external control terminals. The conventional electronic scales do not have the ability to indicate the changing of operators at a prescribed time. Accordingly, the electronic scales presently available have been no more than passive devices which can only weigh articles to be sold, calculate their prices, and total the prices in response to the operator's action through a manual data input device. The use of the manual data input device requires manual labor which is costly due to an increase in personnel expenses, leads to operation errors, and needs a period of time in weighing articles sold and displaying their prices.

Articles for sale are marked with labels showing various pieces of information. For example, labels indicating unit prices need to be applied to articles that will be weighed for sale. No such labels however are needed for articles which will be sold in a fixed quantity or for a fixed amount of money, but effective dates and bar codes have to be printed on such articles. Accordingly, items are printed on articles in various modes dependent on the manners or place of sale. It is convenient with articles for sale on a weight basis to automatically print data on labels attached to the articles in association with an electronic scale immediately after the articles have been weighed thereby. This type of automatic data printing is not necessary with articles to be sold in fixed quantities or for fixed amounts of money. Instead, data should be printed by manually depressing a print key each time an article is sold. Therefore, switching between automatic and manual printing modes is required.

One conventional way for mode selection has been to provide snap switches respectively for modes so that a desired mode can be selected by actuating a corresponding one of the snap switches. Since as many snap switches as there are modes to be selected are required, however, the control panel of an electronic scale with many modes is of a complex arrangement which the user finds cumbersome in operation, and a circuit connected to so many snap switches, is rendered relatively poor in operational reliability.

SUMMARY OF THE INVENTION

It is an object of the present invention to provide an electronic scale having a control unit such as a CPU (central processing unit) for processing various pieces of information necessary for sale of goods, such as goods name, weights, prices, for example, and a CRT (cathode-ray tube) display unit for displaying processed results and the pieces of information themselves to allow the user to see the displayed information immediately.

Another object of the present invention is to provide an electronic scale having a control unit such as a CPU (central processing unit) for processing various pieces of information necessary for sale of goods, such as the name of the goods weights, prices, for example, also time information, and various functions for displaying processed results, the time, and the pieces of information themselves on a CRT display unit and printing these data on a printing unit on a time-dependent basis.

Still another object of the present invention is to provide an electronic scale having a CRT display unit and a totalling capability for automatically totalling data related to articles sold.

A still further object of the present invention is to provide an electronic scale including a CRT display unit for displaying items corresponding to the conventional snap switches, and a mode selection capability with a manual data input device for determining, for each item, whether data is to be printed or not, printed automatically or manually, and prices and other data are to be added or not added.

According to the present invention, an electronic scale comprises an input unit composed of a manual data input device such as ten keys, a scale unit for weighing articles sold, a CRT display unit, and a control unit for effecting arithmetic operations on signals from the input unit and scale unit and for controlling display on the CRT display unit, the CRT display unit being capable of displaying results of the arithmetic operations carried out in the control unit.

The electronic scale is functionally improved by the addition of a timepiece function, a totalling function or a mode selecting function.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is illustrative of an example of an image displayed for mode selection in the electronic scale of FIG. 11;

FIG. 15 shows an example of a displayed image indicating data to be printed on a label in the electronic scale shown in FIG. 11.

DESCRIPTION OF THE PREFERRED EMBODIMENTS

Figures 1, 2:
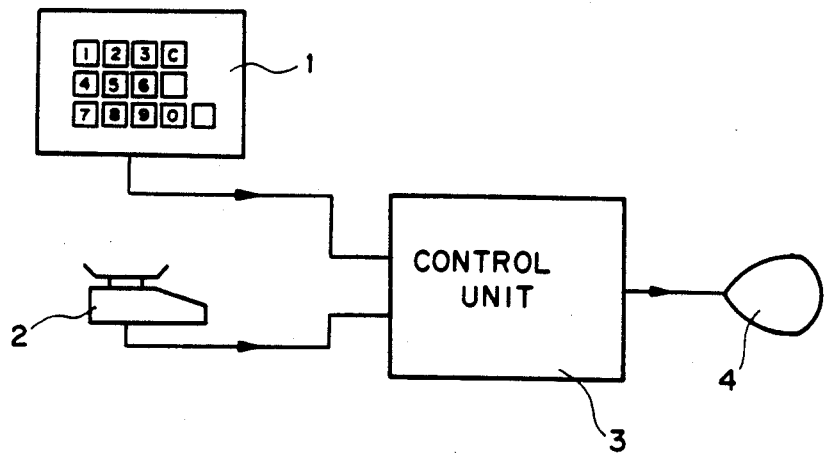
FIG. 1 is a block diagram of an electronic scale with a CRT display capability according to the present invention.
FIG. 2 is illustrative of an example of an image displayed on a CRT display unit in the electronic scale shown in FIG. 1.

FIG. 1 schematically shows in block form an electronic scale according to an embodiment of the present invention. The electronic scale comprises a manual input device 1 composed of ten keys, function keys such as setting keys, and the like, a scale unit 2 for detecting the weight of an article for sale and issuing an electric signal indicative of the detected weight, a control unit 3 such as in the form of a CPU for effecting various arithmetic operations based on the electric signal delivered from the scale unit 2, and a CRT display unit 4 controlled by the control unit 3 for displaying necessary data. The control unit 3 may contain a memory as desired. The CRT display unit 4 is capable of displaying data in the form of Arabic numerals, alphabetical letters, Japanese letters or other characters, and also in the form of graphic or figure representations shown in dots based on signals from the control unit 3.

In operation, the operator depresses the ten keys and setting keys of the manual input device 1 to enter verious pieces of information inherent in an article sold, such as a unit price, article name code, for example, and other items of information needed by the sales manager, such as a date of sale, an operator's code, for example. Signals indicative of these items of information are then delivered to the control unit 3, from which the data are sent to the CRT display unit 4 where the data are displayed in characters and figures on the screen.

When the weight of the article is measured by the scale unit 2, a signal indicative of the weight as measured is delivered to the control unit 3, which then calculates the total price of the article based on the unit price and weight thereof, calculates a subtotal according to article name and operator, converts the article name code into the article name and also converts the operator code into the operator name, and controls the CRT display unit 4 to display the calculated unit price, weight, total price, date, article name, operator name, and subtotal in characters as shown in FIG. 2.

In addition to the article name code, unit price and other data displayed on the CRT display unit 4 as illustrated in FIG. 2, the CRT display unit 4 may also display other necessary items of information, for example, such as a quantity in stock, or a sales tendency of articles as a graph on the same screen so that a strategic sales policy can be established on the displayed information.

The control unit 3 should preferably be equipped with a memory in order to register codes and unit prices of a variety of articles for sale and to enable the CRT display unit 4 to display effective data based on various items of information such as quantities in stock of many kinds of articles. The name, unit price, weight, total price and other data items can be printed on a label by operating a label printer in association with the control unit 1. The data items to be printed on the label can be displayed in the format they are printed on the CRT display unit 4 for confirmation purposes prior to printing of the data.

With the illustrated embodiment of the present invention, items of information necessary for selling articles, such as article names (codes), unit prices, for example, can be displayed, and weights and total prices totalled on the basis of information delivered from the input device and the scale unit can be totalled and displayed according to article name. This allows raw information available at places of sale to be converted into forms the operator can readily understand. The data items can be displayed not only in the form of characters, but also in the form of graphs or figures simultaneously, so that various data items can be displayed for immediate visual comparison. Accordingly, the electronic scale of the present invention is capable of providing information useful for establishing a desired sales strategy.

Figure 3:
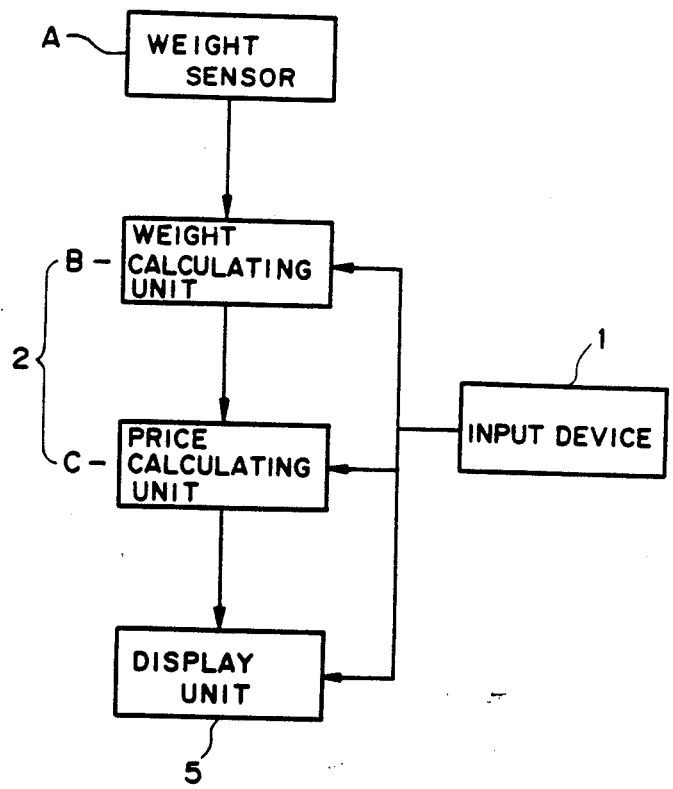
FIG. 3 is a block diagram showing a fundamental function of the electronic scale.

The fundamental function of an electronic scale will be described with reference to FIG. 3. The electronic scale illustrated comprises a weight sensor A for detecting the weight of an article placed on a weighing plate, an arithmetic device 2 composed of a weight computing unit B for calculating the net weight of the article by subtracting the tare from an output from the weight sensor A, and a price computing unit C for calculating the total price by multiplying the net weight by a unit price of the article, a display unit 5 for displaying the unit price, the tare, the total price and other data, and an input unit 1 composed of ten keys and various function keys for entering data on unit prices and tares into the arithmetic device 2 and the display unit 5. The arithmetic device 2 has a RAM (random-access memory) for storing various data items, and a printing device (not shown) having a printing circuit, a printing drum and other components. The weight sensor A includes an A/D (analog-to-digital) converter for converting the measured analog weight into a corresponding digital value.

An arrangement in which a timepiece unit is added to the foregoing electronic scale to provide a timepiece function will be described with reference to FIGS. 4 through 6.

Figures 4, 5:
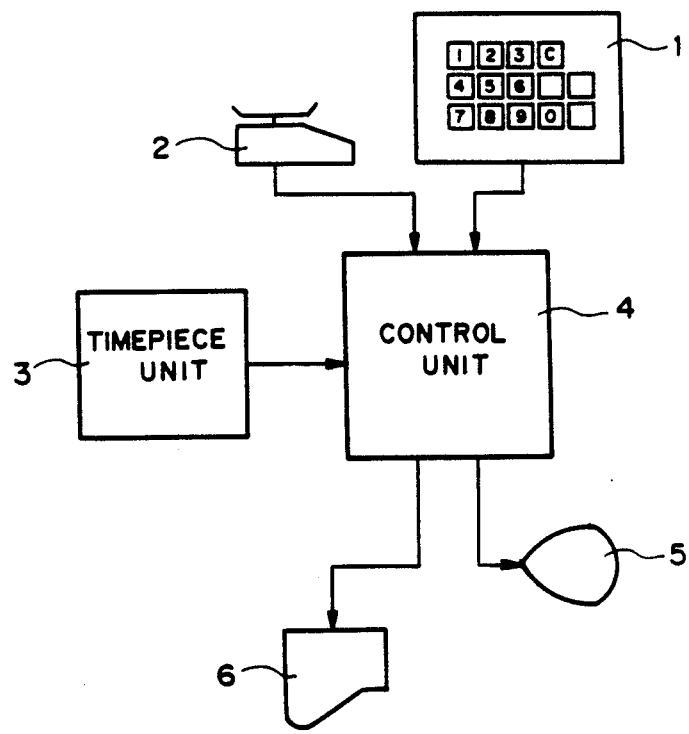
FIG. 4 is a block diagram of an electronic scale with a CRT display unit having a timepiece.
FIG. 5 shows an example of an image displayed on the CRT display unit illustrated in FIG. 4.

FIG. 4 schematically shows in block form an electronic scale according to another embodiment of the present invention. The electronic scale comprises a manual input device 1 composed of ten keys, function keys such as setting keys, and the like, a scale unit 2 for detecting the weight of an article for sale and issuing an electric signal indicative of the detected weight, a timepiece unit 3 for generating a time signal at all times, a control unit 4 for effecting various arithmetic operations based on the electric signals delivered from the input device 1, the scale unit 2, and the timepiece unit 3, and a CRT display unit 5 controlled by the control unit 4 for displaying necessary data. The control unit 4 may contain a memory as desired. The CRT display unit 5 is capable of displaying data in the form of Arabic numerals, alphabetical letters, Japanese hiragana and katakana letters, Chinese characters or other characters, and also in the form of graphic or figure representations shown in combinations of dots. There may be included a printing unit 6, as desired, for recording the data in addition to the display on the CRT display unit 5, for issuing receipts to enable customers as well as the operator to confirm data relating to the sales, and also for issuing labels to be applied to articles for sale.

The electronic scale shown in FIG. 4 will operate as follows: The operator depresses the ten keys and setting keys of the manual input device 1 to enter various pieces of information inherent in an article sold, such as a unit price, article name code, for example, and other items of information needed by the sales manager, such as a date of sale, an operator's code, for example. Signals indicative of these items of information are then delivered to the control unit 4, from which the data are sent to the CRT display unit 5 where the data are displayed in characters and figures on the screen. When the weight of the article is measured by the scale unit 2, a signal indicative of the weight as measured is delivered to the control unit 4, which then calculates the total price of the article based on the unit price and weight thereof, calculates a subtotal according to article name and operator, converts the article name code into the article name and also converts the operator code into the operator name, and controls the CRT display unit 5 to display the calculated unit price, weight, total price, date, article name, operator name, and subtotal in characters as shown in FIG. 5. At this time, the CRT display unit 5 also displays the morning (AM) or the afternoon (PM) and a current time in a prescribed position on the same display screen based on the signal from the timepiece unit 3.

In addition to the article name code, unit price and other data displayed on the CRT display unit 5 based on the input signals from the input unit 1, the scale unit 2 and the timepiece unit 3 as illustrated in FIG. 5, the CRT display unit 5 may also display other necessary items of information such as a quantity in stock, for example. As the tendency of articles sold which are totalled per each hour can also be displayed as a graph on the same display screen with the time of sale indicated on a horizontal axis and the number of artiles sold (or sales) on a vertical axis, so that a strategic sales policy can be established on the displayed information.

Figure 6:
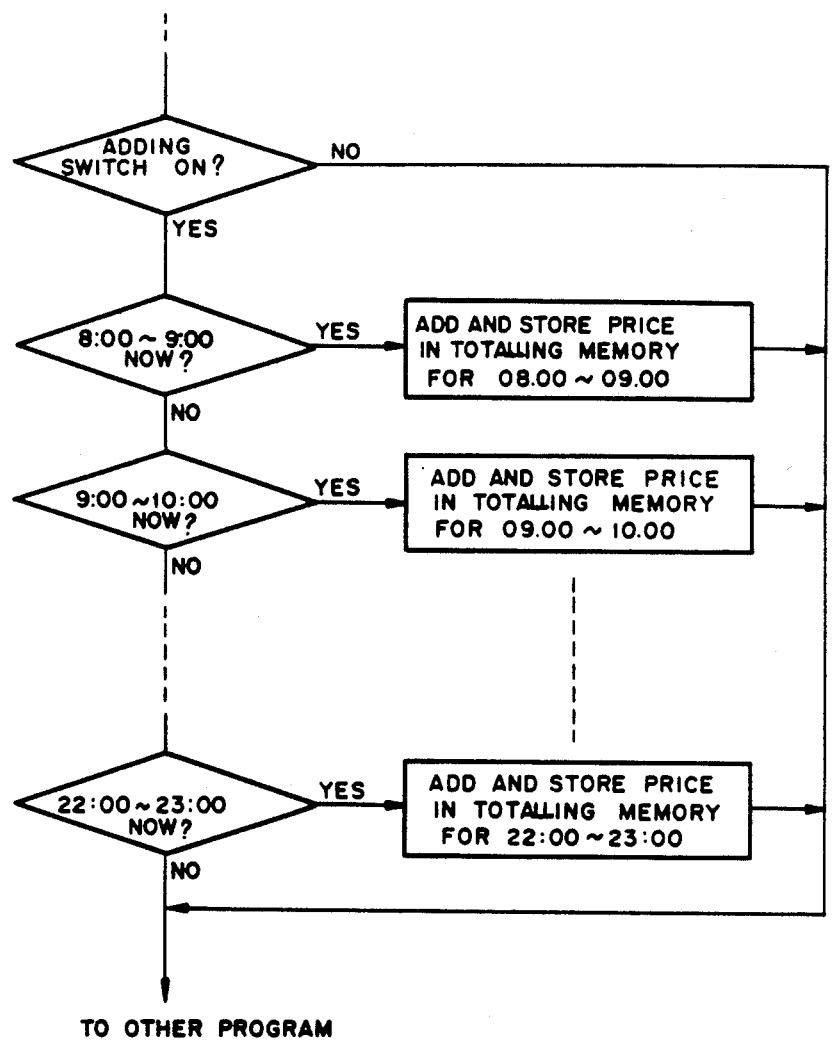
FIG. 6 is a flowchart showing an operation for totalling prices per hour in the electronic scale shown in FIG. 4.

FIG. 6 illustrates a flowchart of a program for totalling the prices of articles sold per hour from 8 AM to 11 PM. An addition switch in the input unit 1 is turned on when an article is weighed. If the time when the addition switch is turned on is 9:23 AM, then the price of the article is added and stored in a 9th-hour totalling memory in the control unit 4.

The time signal from the timepiece unit, that is, the current time may be regarded as an article processing time, and if the current time is 8:14 AM, then "Processing time: 8 AM" may be printed on a label in the printing unit 6. In addition to the current time, a predetermined effective period or an effective term calculated by the control unit 4 may be printed. For example, if the effective period is 12 hours, then "Effective term: 8 PM" may be printed on a label in the printing unit 6.

The printing unit 6 may also print the current time, that is, the time at which an article is sold, on a receipt.

The control unit 4 may be equipped with a timer function for automatically turning on and off a power supply for the CRT display unit 5 and the printing unit 6 at fixed times, and also for automatically starting and stopping the operation of an on-line device connected to an external control terminal of the electronic scale. This automatic control function can save an operator's labor.

Figure 7:
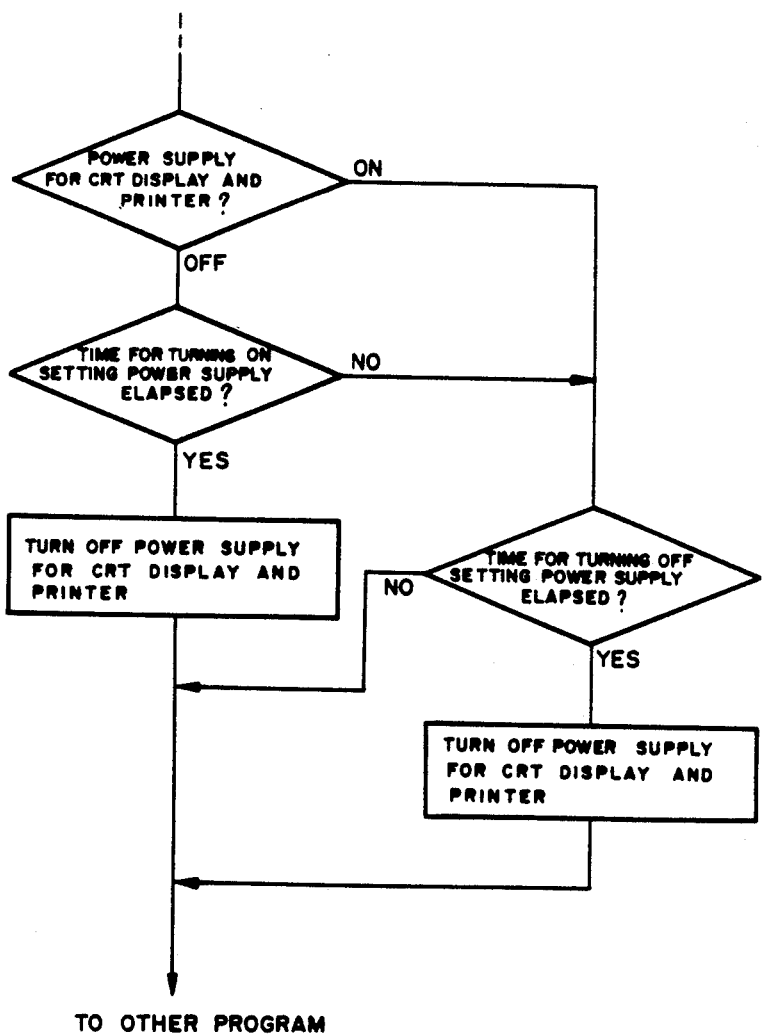
FIG. 7 is a flowchart showing an operation for automatically turning on and off a power supply for the electronic scale illustrated in FIG. 4.

FIG. 7 is a flowchart of a program for automatically turning on and off the power supply for the CRT display unit 5 and the printing unit 6. The program is executed per a constant period of time, for example, every one minute. If the power supply for the CRT display unit 5 and the printing unit 6 is energized, then it is determined whether or not the current time is past a preset time for turning off the power supply. If the current time is past such a preset time, then the power supply is turned off. If the power supply is de-energized, then it is determined whether the current time is past a preset time for turning on the power supply. If the current time is past such a preset time, then the power supply is turned on.

The control unit 4 and the timepiece 3 are always supplied with electric power from a power supply (such as a battery or a commercial power supply) irrespectively of the turning on and off of the power supply for the electronic scale unit 2.

The operator's code and the time at which the operator is to be replaced with another operator may be preset, and the CRT display unit may display data indicating the changing of the operators at the preset time.

The control unit 4 should preferably be equipped with a memory in order to register, in advance, codes and unit prices of a variety of articles for sale and to enable the CRT display unit 5 to display effective data based on various items of information such as quantities in stock of many kinds of articles.

With the foregoing embodiment of the present invention, items of information necessary for selling articles, such as article names (codes), unit prices, for example, can be displayed, and weights and total prices totalled on the basis of information delivered from the input device and the scale unit can be totalled and displayed according to article name. Also, the current time can be displayed and printed on the basis of time signals delivered from the timepiece unit. This allows raw information available at places of sale to be converted into forms the operator can readily understand. The data items can be displayed not only in the form of characters, but also in the form of graphs or figures simultaneously, so that various raw data items including time information can be displayed for immediate visual presentation and can also be displayed at a later time for visual comparison and confirmation. Accordingly, the above electronic scale of the present invention is capable of permitting well-controlled purchase and sale of articles, posting employees to meet sales demands, and automatically operating related devices, a feature which makes the electronic scale quite useful for retailers.

Figure 9:
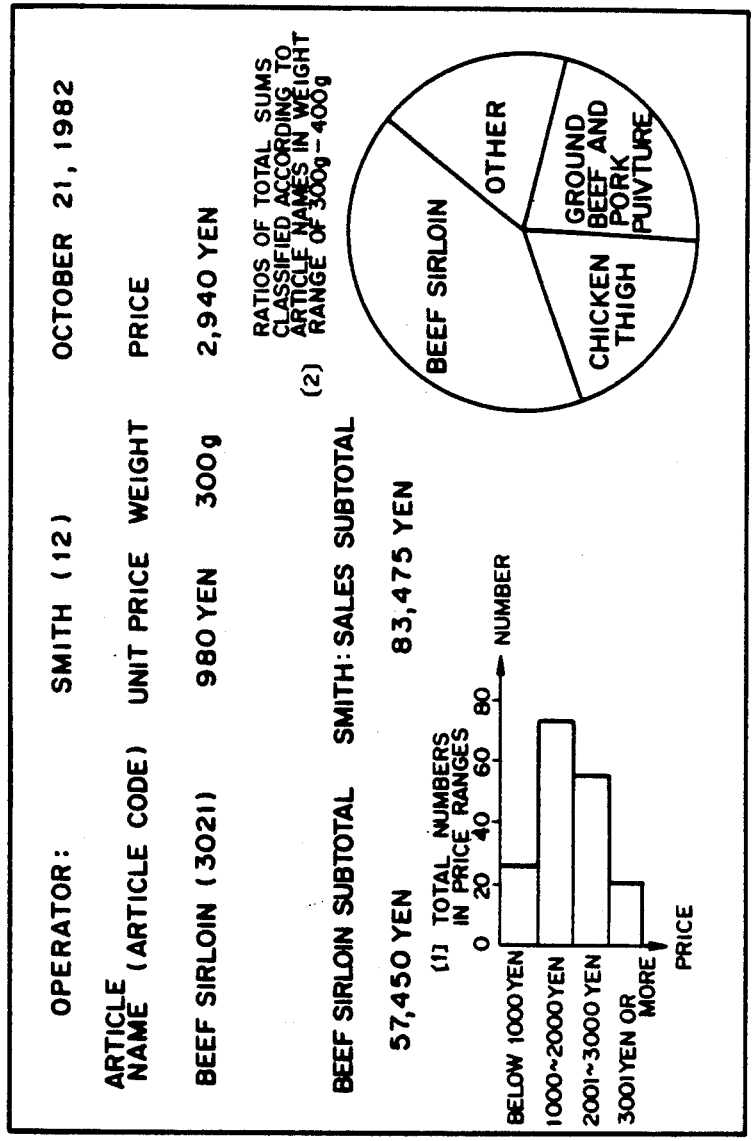
FIG. 9 illustrates an example of an image displayed on the CRT display unit shown in FIG. 8.
Figure 10:
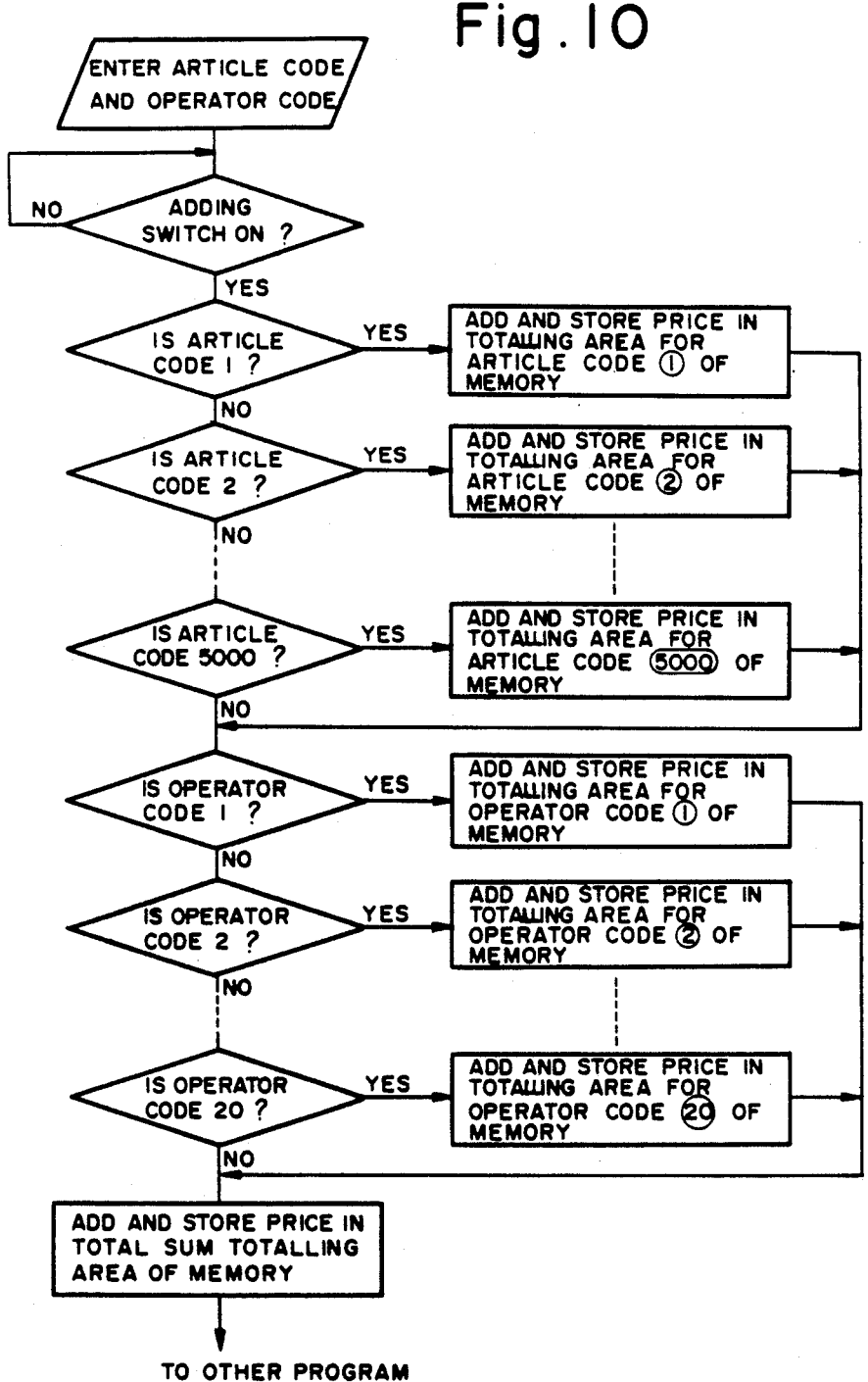
FIG. 10 is a flowchart for an operation for totalling prices for each article name and each operator in the electronic scale illustrated in FIG. 8.

Another arrangement in which a totalling capability is added to the electronic scale with a CRT display unit will be described with reference to FIGS. 8 through 10.

Figure 8:
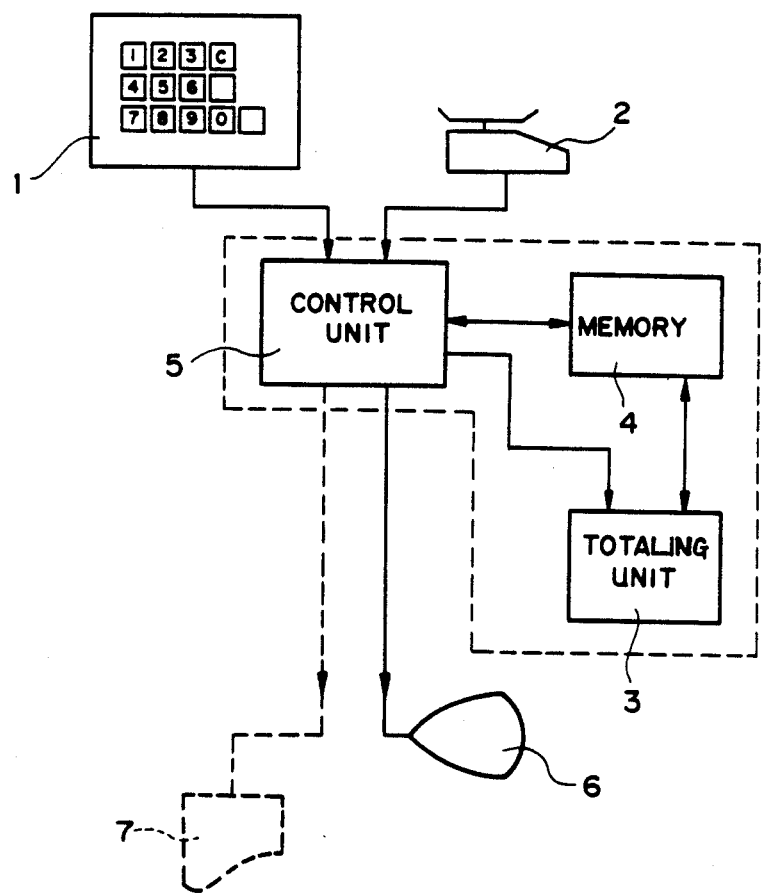
FIG. 8 is a block diagram with a CRT display unit having a totalling function.

FIG. 8 schematically shows in block form an electronic scale according to still another embodiment of the present invention. The electronic scale comprises a manual input device 1 composed of ten keys, function keys such as setting keys, and the like, a scale unit 2 for detecting the weight of an article for sale and issuing an electric signal indicative of the detected weight, a totalling unit 3 for carrying out various adding operations based on electric signals indicative of the total price, the number, the weight of articles sold and delivered from a control unit (described later), and a memory 4 for storing output signals from the totalling unit 3 and for issuing such output signals on demand. A control unit 5 is capable of calculating the total price of an article based on signals from the input unit 1 and the scale unit 2, and of controlling a CRT display unit 6 to display necessary items of information based on the calculated price, the signals from the input unit 1 and the scale unit 2, and the output signals from the memory 4.

The CRT display unit 6 is capable of displaying data in the form of Arabic numerals, alphabetical letters, Japanese hiragana and katakana letters, Chinese characters or other characters, and also in the form of graphic or figure representations shown in combinations of dots based on the signals from the control unit 5, the data being displayed solely or in combination on the same screen. It is general desirable to combine the totalling unit 3, the memory 4 and the control unit 5 as a single circuit arrangement such as a CPU. The electronic scale may be equipped with a printer unit 7, as desired, for printing and recording various pieces of information on journal paper or a label based on the signals from the control unit 5.

In operation, the operator depresses the ten keys and setting keys of the manual input device 1 to enter various pieces of information inherent in an article sold, such as a unit price, article name code, for example, and other items of information needed by the sales manager, such as a date of sale, an operator's code, for example. Signals indicative of these items of information are then delivered to the control unit 5, from which the data are sent to the CRT display unit 6 where the data are displayed in characters and figures on the screen. When the weight of the article is measured by the scale unit 2, a signal indicative of the weight as measured is delivered to the control unit 5, which then calculates the total price of the article based on the unit price and weight thereof, converts the article name code into the article name and also converts the operator code into the operator name, and controls the CRT display unit 6 to display the unit price, weight, total price, date, article name, and operator name in characters and figures as shown in FIG. 5. The totalling unit 3 totals the prices of the articles sold according to the operator names and displays the totalled prices as shown in FIG. 9. FIG. 10 is a flowchart of an operation for totalling the prices according to the article names and operator names. An article code is entered and checked, and the price of the article as calculated is added and stored in a corresponding article code totalling area. An operator code entered thereafter is checked, and the calculated article price is added and stored in a corresponding operator code totalling area, and also added and stored in a total price totalling area of the memory 4.

From the standpoint of weights, the prices and the number of articles for sale in a certain weight range (from 500 to 600 g, for example) can be totalled and displayed. From the standpoint of prices, the prices and the number of articles for sale in a certain price range (from 1,000 to 2,000 yen, for example) can be totalled and displayed. Furthermore, the totalled sums of the prices of articles for sale grouped according to article names and having a certain weight range (from 300 to 400 g, for example) can be divided by the total of the prices of all of the articles in the weight range to derive the ratios of the articles according to the article names for display.

The crude information can be displayed in forms which can easily be understood by the operator, such as a circle graph or bar graph.

When the number of articles sold is to be totalled, the number can be determined by enabling the control unit 5 to count ON signals from an adding switch in the input device 1 which is turned on each time an addition totalling is made, or by entering the number through the ten keys of the input device 1. The operator can designate or select, as desired, either a numerical display or a graphic display on the CRT display unit 6 by changing over the switch to meet demands on site.

The memory 4 can register in advance a multiplicity of article names, unit prices and other data, and enables data on quantities in stock of many kinds of articles or effective data based on various items of information such as the sum of the article prices to be displayed on the CRT display unit 6.

The printer unit 7 can be operated in association with the electronic scale for printing the names, unit prices, weights, total prices of articles sold, and their price total on a label or journal paper. The data to be printed on the label or journal paper can be displayed for confirmation on the CRT display unit 6 in the format in which the data will be printed on the label or journal paper.

With the foregoing embodiment, the CRT display unit can print not only such information as article codes and unit prices necessary for sale, but also various totalled sums such as amounts of money for various articles sold, the number of or amounts of money for articles sold in different weight ranges, and the number of articles sold in various price ranges together with the weights and prices based on the information from the input device, scale unit, and memory. Accordingly, the raw information produced at the place of sale can be presented in the best form the operator and manager can readily understand. The data can be displayed not only in the form of characters and numerals, but also in graphs and figures simultaneously, so that a variety of data items can be compared visually at a glance. Therefore, the electronic scale can provide information useful for establishing a sales strategy.

An arrangement in which a mode selecting function is added to the electronic scale with a CRT display capability will finally be described with reference to FIGS. 11 through 15.

Figure 11:
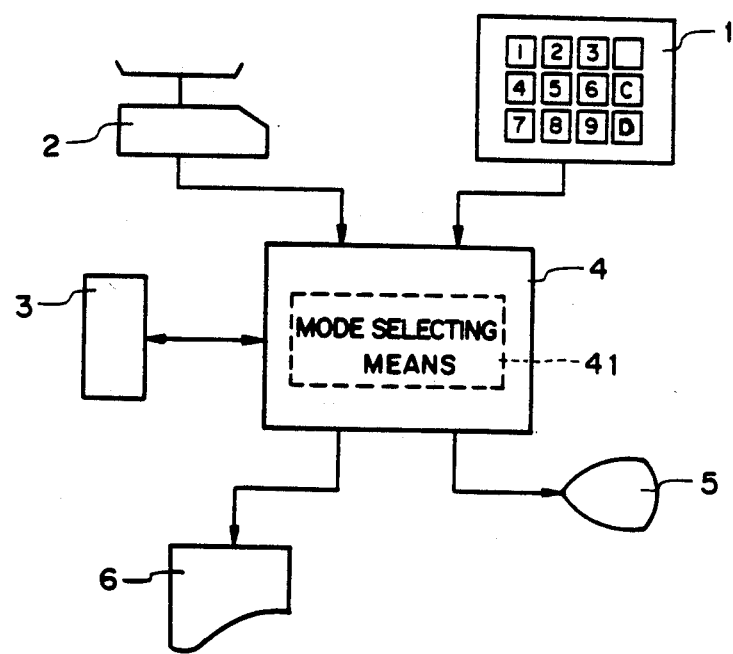
FIG. 11 is a block diagram of an electronic scale with a CRT display unit having a mode selecting function.

FIG. 11 is a block diagram of a basic construction of such an electronic scale. The electronic scale comprises a manual input device 1 composed of ten keys, function keys such as setting keys, and the like, a scale unit 2 for detecting the weight of an article for sale and issuing an electric signal indicative of the detected weight, and a memory 4 for storing mode information (described below) and other information necessary for operating the electronic scale. A control unit 4 comprises a central processing unit (CPU) including an arithmetic means for effecting arithmetic operations necessary for the sale of various articles such as arithmetic operations to derive prices from unit prices and weights based on signals from the input device 1, the scale unit 2 and the memory 3, and arithmetic operations such as adding and totalling prices, for example, a display control means for controlling a CRT display unit 5 (described below) to display the results of arithmetic operations carried out by the arithmetic means and other necessary data, a print control means for enabling a printer unit 6 (described below) to print a label in a selected mode, and a mode selecting means 41 for selecting a mode in response to mode information entered from the input device 1.

The CRT display unit 5 is capable of displaying data in the form of Arabic numerals, alphabetical letters, Japanese hiragana and katakana letters, Chinese characters or other characters, and also in the form of graphic or figure representations shown in combinations of dots based on the signals from the control unit 4.

The printer unit 6 is capable of printing data displayed on the CRT display unit 5, particularly data on labels to be applied to articles for sale.

The electronic scale of the foregoing construction can issue labels indicative of data dependent on forms and places of sale as illustrated in FIG. 15. Before labels are issued, it is necessary to effect various mode selecting operations to set in the memory actual numerical data under items to be printed on the labels.

Figure 13:
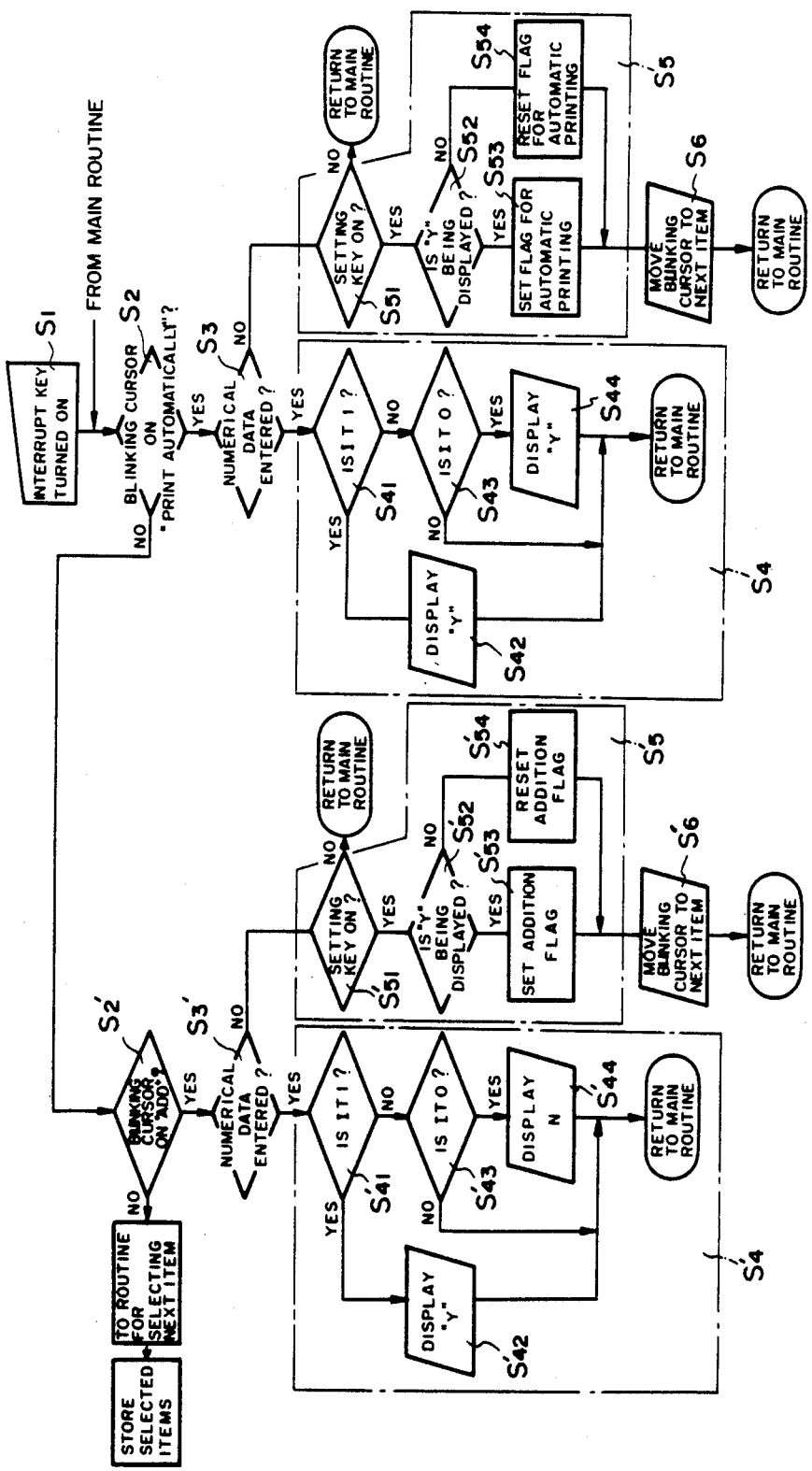
FIG. 13 is a flowchart showing an operation of a mode selecting means in the electronic scale illustrated in FIG. 11.

FIG. 12 is illustrative of an example of an image displayed for mode selecting operations, and FIG. 13 is a flowchart showing operations of the mode selecting means used in such a mode selecting operation. The mode selecting means can effect roughly two processes such as an input process S4 and a registration process S5.

For mode selection, an interrupt key is depressed in a step Sl to enable the image such as shown in FIG. 12 on the CRT display unit 5.

At this time, a blinking cursor is automatically brought to an uppermost item, that is, "PRINT AUTOMATICALLY". In a step S2, the position of the blinking cursor is confirmed, and then the key "1" or "0" is depressed. The program now goes to the input process S4. If the key "1" is pushed in a step S41, then "Y" indicative of affirmation of automatic printing is displayed at the end of the item "PRINT AUTOMATICALLY". If the key "0" is depressed in a step S43, then "N" indicating negation of automatic printing is displayed at the end of the same item.

After the foregoing operation has been completed, the program returns to a main routine, and then proceeds to the step S2, which determines whether "1" or "0" is depressed in the step S3. If not (NO in the step S3), then the program goes to a step S5 for registration. More specifically, if any of numerical keys from "0" to "9" is not depressed in the step S3, a step S51 determines whether a setting key is depressed or not. If depressed, then a step S52 determines whether the CRT display unit 5 displays "Y" or "N". If "Y" is displayed, then a flag for automatic printing is set in the memory 3 in a step S53. If "N" is displayed, then such a flag if any is erased, and then the blinking cursor is moved to a next item "ADD". The program again determines in the step S2 whether the blinking cursor is positioned on the item "PRINT AUTOMATICALLY". Since the blinking cursor has been moved to the next item, a step S'2 determines whether the blinking cursor is positioned on the next item "ADD". Then, a step S'3 determines whether any numerical key is depressed or not, and an input process S'4 and a registration process S'5 similar to the processes S4, S5 are executed. The blinking cursor goes down the display screen until the final item on the same screen is set up, whereupon another screen with new items set forth is displayed. The new items are then selected and set up in the procedure as described above. After the last item on the final screen has been set up, the first screen is displayed again. When a "NEXT" key is depressed at any time in the course of the mode setting operation, the program leaves any item on any screen and a next screen with a new list of items is displayed.

Figure 14:
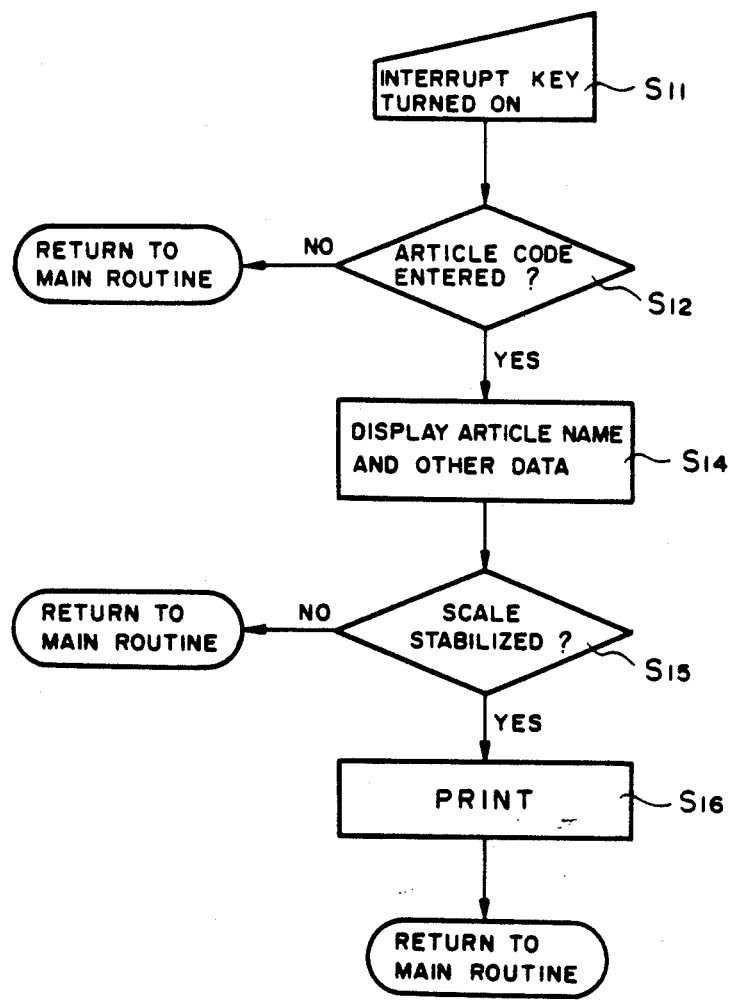
FIG. 14 is a flowchart showing an operation of a printing control means in the electronic scale of FIG. 11.

FIG. 14 is a flowchart showing the process in which data items are actually printed under the control of the print control means in the control unit 4 in accordance with a selected mode.

In a step S11, a key is depressed for an interrupt, and in a step S12, a code of an article for sale is entered through the ten keys. Then, data items to be printed on a label are displayed on the screen as illustrated in FIG. 6. The weight data entered from the scale unit 2 and the price calculated by the control unit 4 based on the weight data are displayed under the items "NET WEIGHT" and "PRICE". The article name, unit price (price per 100 g, for example), department code, processing date, and date by which the article remains best, which are stored in the memory 3 are displayed in a step S14. At the same time that the weight data from the scale unit 2 become stable in a step S15, the printer unit 6 is actuated in a step S16 to print the data as displayed on the screen on a label according to the selected mode. The foregoing process is repeated each time an article is weighed.

For manual printing, the printer unit is operated when a print command signal issued in response to depression of a print key enters the control unit 4.

The second item "ADD" on the screen as shown in FIG. 12 has no bearing on the mode of printing on labels applied to articles for sale. When this item is selected, the weights and prices of articles weighed as labels are issued are added, and their totals are displayed on the CRT display unit 5 or printed by the printer unit 6. Furthermore, the sales classified according to the kinds of articles and sales persons in charge can also be displayed and printed.

As described above, the electronic scale of the foregoing construction includes a mode selecting means associated with a control unit for selecting print items, an automatic or manual printing mode, and an addition or non-addition mode. The electronic scale is quite simple in structure, reliable in operation, and less costly to construct.

Although certain preferred embodiments have been shown and described, it should be understood that many changes and modifications may be made therein without departing from the scope of the appended claims.

What is claimed is:

1. An electronic scale comprising:
    (a) input means including a manual data input device for entering nput data including at least unit prices of articles;
    (b) weighing means for measuring the weights of the articles;
    (c) control means for effecting an arithmetic operation in response to the unit price entered from said input means and the weight measured by said weighing means to calculate a price of each respective article;
    (d) totalling means for totalling said prices, the prices and the number of articles for sale in a given weight range, and the prices and the number of articles for sale in a given price range;
    (e) calculating means for calculating respective ratios of the sales amounts of the articles according to the article names;
    (f) memory means for storing the sum of said total prices, said prices and said number of articles for sale in a given weight range, said prices and said number of articles for sale in a given price range, and said ratios of the sales amount of the articles according to said article names; and
    (g) display means for displaying said input data from said input means, the result of the arithmetic operation by said control means, said sum of said total prices, said prices and said number of articles for sale in a given weight range, said prices and said number of articles for sale in a given price range, and said ratio of the sales amount of the articles according to the article names stored in said memory means under the control of said control means.

2. An electronic scale according to claim 1, wherein said control means, said totalling means, said calculating means and said memory means are constituted of a central processing unit.

3. The scale of claim 1, comprising timepiece means for generating a clock signal, wherein said control means controls said display means to display information based on said clock signal.

4. The scale of claim 1, wherein said totalling means, memory means and display means operate as stated for respective pluralities of said given ranges.

* * * * *

UNITED STATES PATENT AND TRADEMARK OFFICE
CERTIFICATE OF CORRECTION

PATENT NO. : 4,597,457
DATED : July 1, 1986
INVENTOR(S) : Ikekita

It is certified that error appears in the above-identified patent and that said Letters Patent is hereby corrected as shown below:

Front page, [57] ABSTRACT, line 6, after "means" insert --,--.

Col. 1, line 62, after "and" insert --they--.

Col. 2, line 52, after "goods" insert --,--;
         line 52, after "example," insert --and--.

Col. 4, line 13, "veri-" should be --vari- --.

Col. 6, line 14, after "As" insert --another example,--;
         line 17, "artiles" should be --articles--.

Col. 7, line 58, "general" should be --generally--.

Col. 8, line 57, after "as the" insert --past--.

Col. 11, line 22, "nput" should be --input--.

Signed and Sealed this

Fourteenth Day of October, 1986

[SEAL]

Attest:

DONALD J. QUIGG

*Attesting Officer*     *Commissioner of Patents and Trademarks*